(12) United States Patent
Shima

(10) Patent No.: US 6,676,309 B2
(45) Date of Patent: Jan. 13, 2004

(54) PRINTER HAVING FUNCTION OF ADMINISTRATING PRINT JOB AND METHOD FOR ADMINISTRATING PRINT JOB

(75) Inventor: Toshihiro Shima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 121 days.

(21) Appl. No.: 09/750,557

(22) Filed: Dec. 28, 2000

(65) Prior Publication Data

US 2001/0014237 A1 Aug. 16, 2001

(30) Foreign Application Priority Data

Dec. 28, 1999 (JP) ............................. 11-375819

(51) Int. Cl.[7] ................................. B41J 5/30
(52) U.S. Cl. ........................................ 400/61
(58) Field of Search .................. 400/61, 74; 395/109; 399/79

(56) References Cited

U.S. PATENT DOCUMENTS

| | | | |
|---|---|---|---|
| 5,500,715 A | | 3/1996 | Ta et al. |
| 5,706,410 A | | 1/1998 | Bagley et al. |
| 6,021,258 A | * | 2/2000 | Ishuzu et al. ............. 395/109 |
| 6,275,667 B1 | * | 8/2001 | Miyazaki .................... 399/79 |
| 6,280,105 B1 | * | 8/2001 | Lida ............................ 400/74 |
| 6,320,667 B1 | * | 11/2001 | Mitsuhashi ................ 358/1.1 |
| 6,385,348 B1 | * | 5/2002 | Harada ....................... 382/284 |
| 6,397,265 B1 | * | 5/2002 | Iwamoto .................... 710/1 |

FOREIGN PATENT DOCUMENTS

| | | |
|---|---|---|
| JP | 6-149494 | 5/1994 |
| JP | 9-212315 | 8/1997 |
| JP | 9-300787 | 11/1997 |
| JP | 10-289072 | 10/1998 |
| JP | 11-105371 | 4/1999 |
| JP | 11-184654 | 7/1999 |
| JP | 2001-187468 | 7/2001 |

OTHER PUBLICATIONS

Office Action issued on May 2, 2002 in corresponding Japanese patent application, with English translation, 8 pgs.
Translation of the cited paragraphs of laid–open patent application No. 9–300787, 13 pgs.
Patent Abstracts of Japan, Publication No. 11184654, Jul. 9, 1999, 1 pg.
Patent Abstracts of Japan, Publication No. 11105371, Apr. 20, 1999, 1 pg.
Patent Abstracts of Japan, Publication No. 09300787, Nov. 25, 1997, 1 pg.
Patent Abstracts of Japan, Publication No. 06149494, May 27, 1994, 1 pg.
Patent Abstracts of Japan, Publication No. 09212315, Aug. 15, 1997, 1 pg.
Patent Abstracts of Japan, Publication No. 10289072, Oct. 27, 1998, 1 pg.
Patent Abstracts of Japan, Publication No. 2001187468, Jul. 10, 2001, 1 pg.
European Search Report, Mar. 18, 2003, 3 pgs.

* cited by examiner

*Primary Examiner*—Anh T. N. Vo
(74) *Attorney, Agent, or Firm*—Rosenthal & Osha L.L.P.

(57) ABSTRACT

In the present invention, by embedding job administration information into print job data when a printer driver produces print job data, a printer which receives the print job data extracts the job administration information from the print job data at the stage that the printer spools the print job data to a hard disc or the like and the administration of the print job data is executed based on the job administration information. Accordingly, even before the print job data is interpreted for printing processing, a host apparatus which has obtained the job administration information can individually administrate the print job data supplied to the printer based on the print job data.

15 Claims, 6 Drawing Sheets

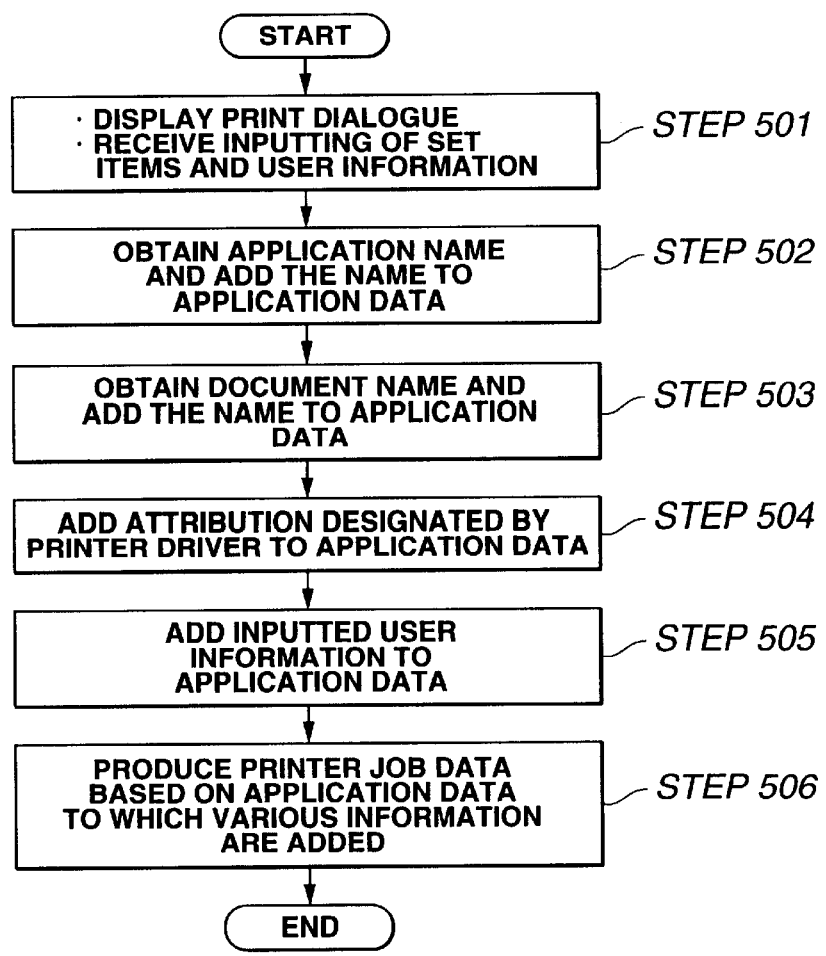
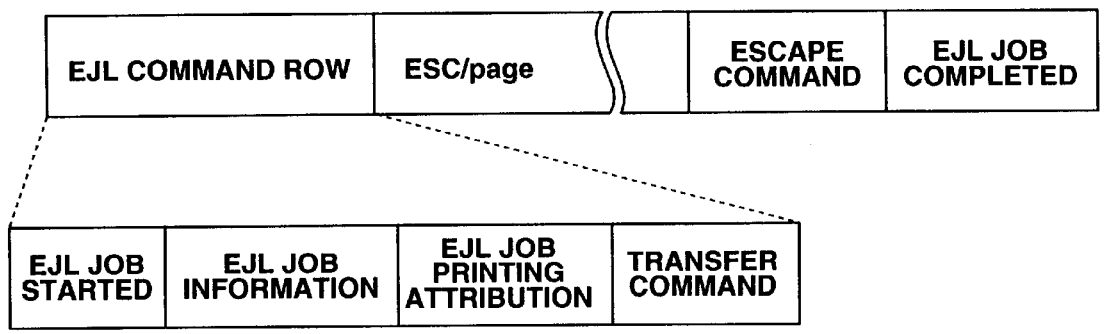

PRINTER HAVING FUNCTION OF ADMINISTRATING PRINT JOB AND METHOD FOR ADMINISTRATING PRINT JOB

BACKGROUND OF THE INVENTION

1. Field of the Invention

The present invention relates to a technique for administrating print job data. The present invention more particularly relates to a printer driver to be mounted on a host apparatus and a printer which processes print job data produced by the printer driver.

2. Description of the Related Art

To utilize a printer, a host apparatus generally requires a printer driver (a printer control program). Upon receiving application data from an application program, the printer driver converts the application data into print job data (print command) which is intrinsic to the printer and outputs the print job data to the printer. Upon receiving the print job data, the printer spools and interprets the print job data and produces bit map data and realizes a print on a printing paper.

Recently, a network-usable-type printer which is connected to a LAN constructed by Ethernet or the like and is commonly used by a plurality of host apparatuses has been popularly used. The host apparatus executes a network communication with the printer in accordance with a given network protocol and transmits the print job data outputted from the printer driver into the printer. The network protocol for making the host apparatus transmit the print job data to the printer includes, for example, a LPR protocol mounted on a TCP/IP.

In the printer driver, when information on the application data which is to be printed is written in the print job data, the printer can obtain the information only at a stage after interpreting the print job data for printing processing. Accordingly, there has been a drawback that the host apparatus cannot execute an administration of the print job data such as the acquisition of the printing condition in terms of the print job data being spooled in the inside of the printer or the print job data waiting for the processing or the canceling of the printing processing.

To avoid such drawbacks, there has been proposed a method which expands the protocol of the network and supplies the print job information into the protocol. However, the provision of a new print system which alters the existing platform and administrates the print job data which the host apparatus transmitted to the printer is costly and hence unrealistic.

Accordingly, it is an object of the present invention to provide a print system which can administrate print job data without requiring a large change of the existing platform before the print job data is interpreted for the print processing after the print job data is supplied to a printer.

SUMMARY OF THE INVENTION

The gist of the present invention lies in that a printer driver embeds job administration information into print job data at the time of producing the print job data and hence, a printer which receives the print job data extracts the job administration information from the print job data at a stage of spooling the print job data into a hard disc or the like and administration of the print job data can be executed based on the job administration information. Due to such a constitution, even before the print job data is interpreted for print processing, a host apparatus which has obtained the job administration information can individually administrate the print job data supplied to the printers based on the job administration information.

That is, the printer according to the present invention includes first reception means which receives print job data including job administration information, extracting means which extracts the job administration information from the print job data received by the first reception means, memory means which stores the print job data received by the first reception means, interpretive means which produces bit map data based on the print job data read out from the memory means, printing executing means which executes printing based on the bit map data which is produced by the interpretive means, and job administration means which administrates the print job data stored by the memory means based on the job administration information extracted by the extracting means.

Here, the printer may be further provided with second reception means which receives a job administration request transmitted from the host apparatus and the job administration means transmits a response to the job administration request to the host apparatus based on the job administration information. This job administration request is, for example, an inquiry request of the job status or a cancellation request of specific print job data.

The job administration means is characterized in that a state that the print job data is received by the first reception means and is outputted to the memory means (during writing), a state that the print job data is stored in the memory means (already written) or a state that the print job data is read out from the memory means (already read out) or the like is transmitted to the host apparatus as the job state.

Further, in the print control method according to the present invention which comprises a receiving step for receiving print job data which is transmitted from a host apparatus and includes job administration information, an extracting step for extracting the job administration information from the print job data received by the receiving step, a storing step for outputting the print job data received by the receiving step into given memory means, an interpreting step for producing bit map data based on the print job data read out from the memory means, and a printing step for executing printing based on the bit map data produced by the interpreting step, the print control method further includes an administrating step in which before the print job data is read out from the memory means in the interpreting step, the print job data is administrated based on the job administration information extracted by executing the extracting step.

Further, the present invention is realized as a program executed by a controller of a printer and a recording medium which records the program. The recording medium includes, for example, a memory such as a RAM or a ROM in addition to a hard disc (HD), a DVD-RAM, a flexible disc (FD) and a CD-ROM and the like. Further, the printer includes, for example, a so-called microcomputer or the like which executes given processing by interpreting the program using a so-called central processing unit such as a CPU or a MPU. The program may be realized as a program which has a function of calling a function realized by a basic program such as an operating system.

Still further, the present invention is constituted by a print system which is comprised of a host apparatus and a printer. Here, the host apparatus comprises user interface means which displays a given input request screen and receives given job administration information from a user, producing means which produces print job data based on the received job administration information and application data which constitutes a printing object, first transmitting means which transmits the produced print job data to the printer, and second transmitting means which transmits the job administration request to the printer. Further, the printer includes first receiving means which receives the print job data transmitted from the host apparatus, extracting means which extracts the job administration information from the received print job data, memory means which stores the received print job data, interpretive means which produces bit map data based on the print job data read out from the memory means, printing executing means which executes printing based on the bit map data produced by the interpretive means, and job administration means which administrates the print job data stored in the memory means based on the job administration information.

According to the present invention, in the state that the print job data supplied to the printer is spooled, the administration of the print job data becomes possible.

Further, according to the present invention, since the print driver supplies the job administration information as additional data, even when a plurality of communication interfaces (including a network protocol) are provided, it is unnecessary to define the transaction of job administration information for each communication interface and the transaction can be processed unitarily.

In this specification, means does not simply imply physical means but includes a case where a function that the means has is realized by software. Further, a function that single means has may be realized by two or more physical means, or functions of two or more than two means may be realized by single physical means.

BRIEF DESCRIPTION OF THE DRAWINGS

FIG. 5 is a view for explaining the detailed operation of a printer driver body 44 of the present invention.

FIG. 6 is a view showing one example of a data structure of print job data of the present invention.

DESCRIPTION OF THE PREFERRED EMBODIMENTS

Subsequently, embodiments of the present invention are explained hereinafter in conjunction with attached drawings.

Figure 1:
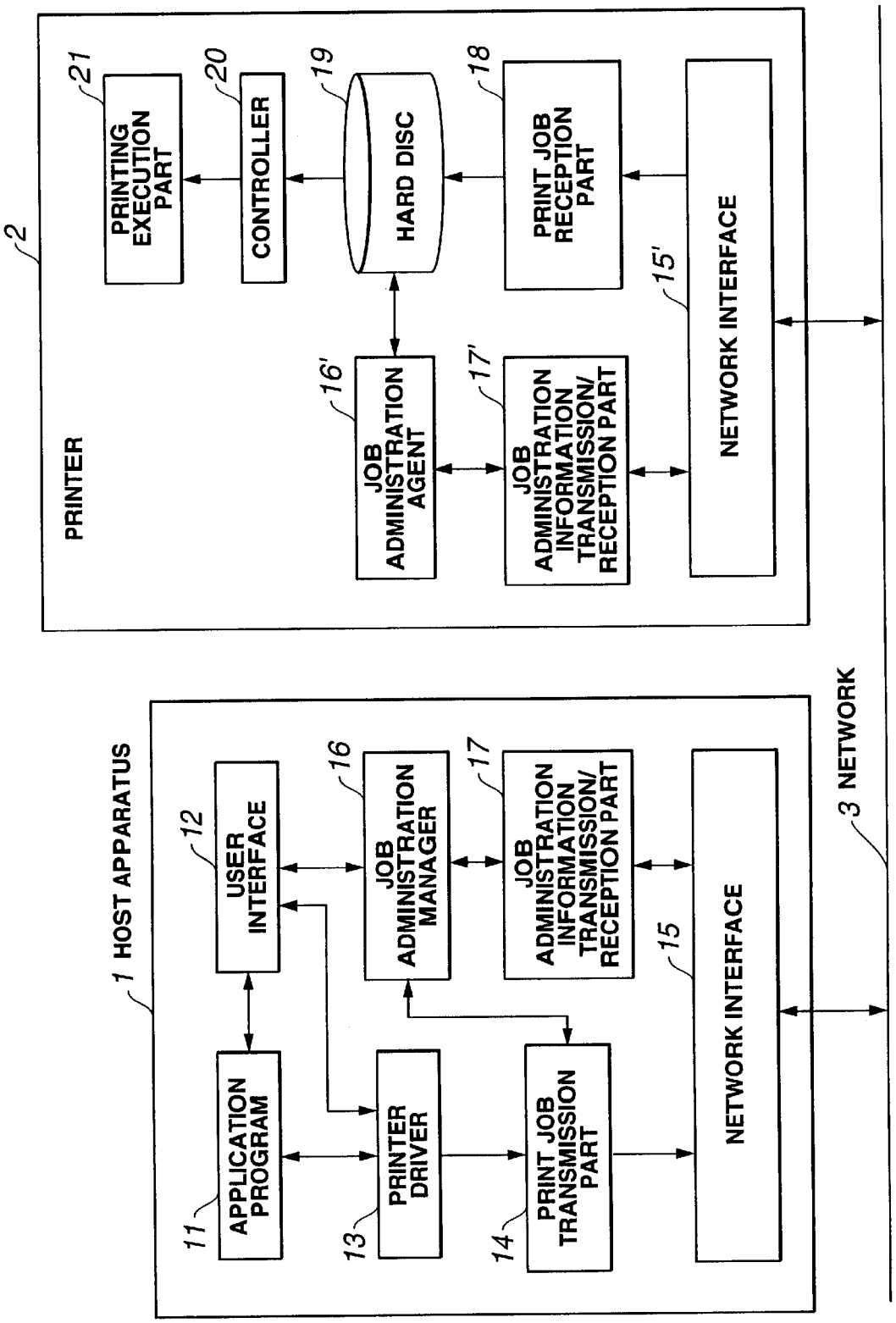
FIG. 1 is a view for explaining the abstract of a print system according to the present invention.

FIG. 1 is a view for explaining an abstract of a print system according to this embodiment. As shown in the drawing, a host apparatus 1 and a printer 2 are connected with each other through a network 3 thus constituting a print system. In the drawing, among a plurality of host apparatuses 1 and a plurality of printers 2 connected to the network 3, only one host apparatus and only one print system are shown as their representatives.

An application program 11 is, for example, a word processor for preparing and editing documents or the like, a graphic editor for preparing and editing drawings or the like. When a print command is given to the application program 11 from a user through a user interface 12, the application program 11 calls a printer driver 13. The printer driver 13 displays a print dialogue box through the user interface 12 and prompts the user to input given set items and the like. Then, when a print execution instruction (such as the selection of an "OK" button switch) is given by the user through the user interface 12, the printer driver 13 receives an application data which constitutes a printing object from the application program 11 and converts the application data into print job data to be interpreted by the printer 2 and outputs the print job data to a print job transmission part 14. In this case, the printer driver 13 embeds information concerning the print job (a job administration information) into the outputting data in addition to a print command which the printer interprets for an original printing. The print job transmission part 14 converts the print job data transmitted from the printer driver 13 physically/logically and outputs the converted print job data to a network interface 15. That is, the print job transmission part 14 realizes a communication service which is positioned at an upper layer protocol in a network hierarchical structure model. The network interface 15 realizes a communication service which is positioned at a lower layer protocol in the network hierarchical structure model. The network interface 15 transmits the data to a network interface 15' of the printer 2 through the network 3. A job administration manager 16 executes communication with a job administration agent 16' of the printer 2 through job administration information transmission/reception parts 17, 17' in accordance with a given protocol and administrates the job in the printer 2. The job administration agent 16' constitutes an executing entity which administrates a job for the print job data supplied to the printer 2. The job administration information transmission/reception parts 17, 17' realize the communication service using a protocol different from the protocol for the communication of the print job data. Accordingly, the host apparatus 1 can administrate the job in the inside of the printer 2.

The network interface 15' analyzes the data of the lower layer protocol received through the network 3 and transforms the into the data of the upper layer protocol and transfers the data to a print job reception part 18. The network interface 15' also extracts the job administration information added by the print job transmission part 14 and transmits the information to the job administration information transmission/reception part 17' in a process for converting the data transmitted from the host apparatus 1 from a lower layer protocol to an upper layer protocol. The print job reception part 18 converts the received data of the upper layer protocol into the original print job data and outputs this data to a hard disc 19. A controller 20 interprets the print job data spooled in the hard disc 19 and produces bit map data and develops the data in an image memory not shown in the drawing. When the controller 20 develops the bit map data in the image memory, the controller 20 transmits a print request to a printing executing part 21. Accordingly, the bit map data is supplied to the printing executing part 20. The printing executing part 21 executes the printing on a printing paper based on the supplied bit map data.

The job administration agent 16' administrates the spool status of the hard disc 18 based on the job administration information transmitted from the network interface 15'. Then, when the job administration agent 16' receives an inquiry request of the job information from the job administration manager 16 of the host apparatus 1, the job administration agent 16' replies the host apparatus with the job information which the job administration agent 16' per se administrates. Alternately, when the job administration agent 16' receives a cancellation request of a specific job, the job administration agent 16' executes processing for canceling the designated print job data spooled in the hard disc 18.

Figure 2:
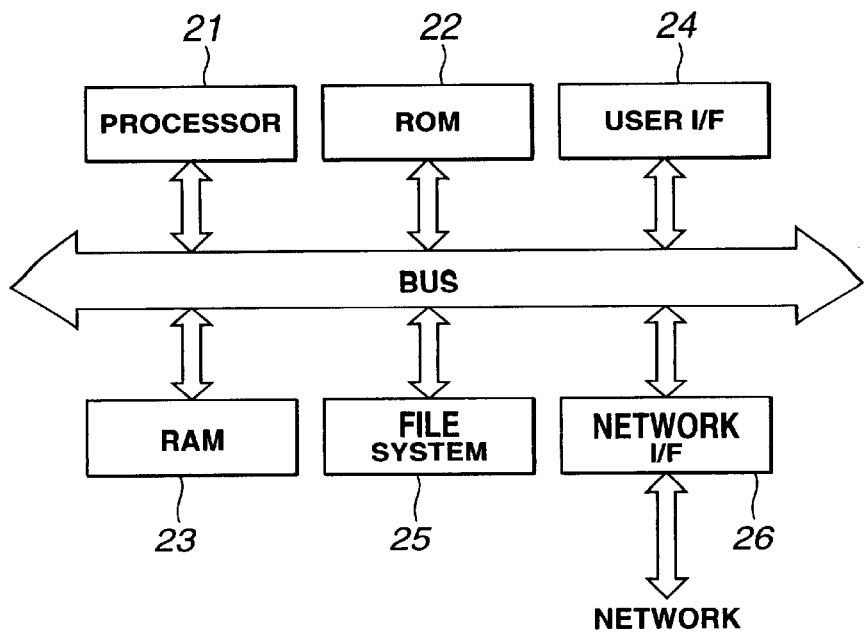
FIG. 2 is a view showing one example of a hardware constitution of a host apparatus 1 of the present invention.

FIG. 2 is a view showing one embodiment of the hardware construction of the host apparatus 1 according to the present invention. In the drawing, a processor 21 executes various programs stored in a ROM 22 or a RAM 23 under the control of the operating system. That is, by executing various programs using the processor 21 together with other hardware, the functions shown in FIG. 1 can be realized in the host apparatus 1. A user interface 24 is, typically, constituted by a display device, an input device such as a keyboard or a mouse and a device driver which controls them. Due to such a constitution, the user interface 24 realizes an interactive manipulation by the user. A file system 25 may be, for example, a so-called exterior device which is constituted by a hard disc device, a CD-ROM device and a device driver for them and stores various programs and data. A network interface 26 is a network board for physically connecting the network A with the host apparatus body. The network interface 26 converts the data in the inside of the host apparatus 1 physically/logically and transmits the converted data to the network 3 or extracts the data which flows on the network 3 and is addressed to the network interface 26 per se and converts the data physically/logically and inputs the converted data to an inner bus.

Figure 3:
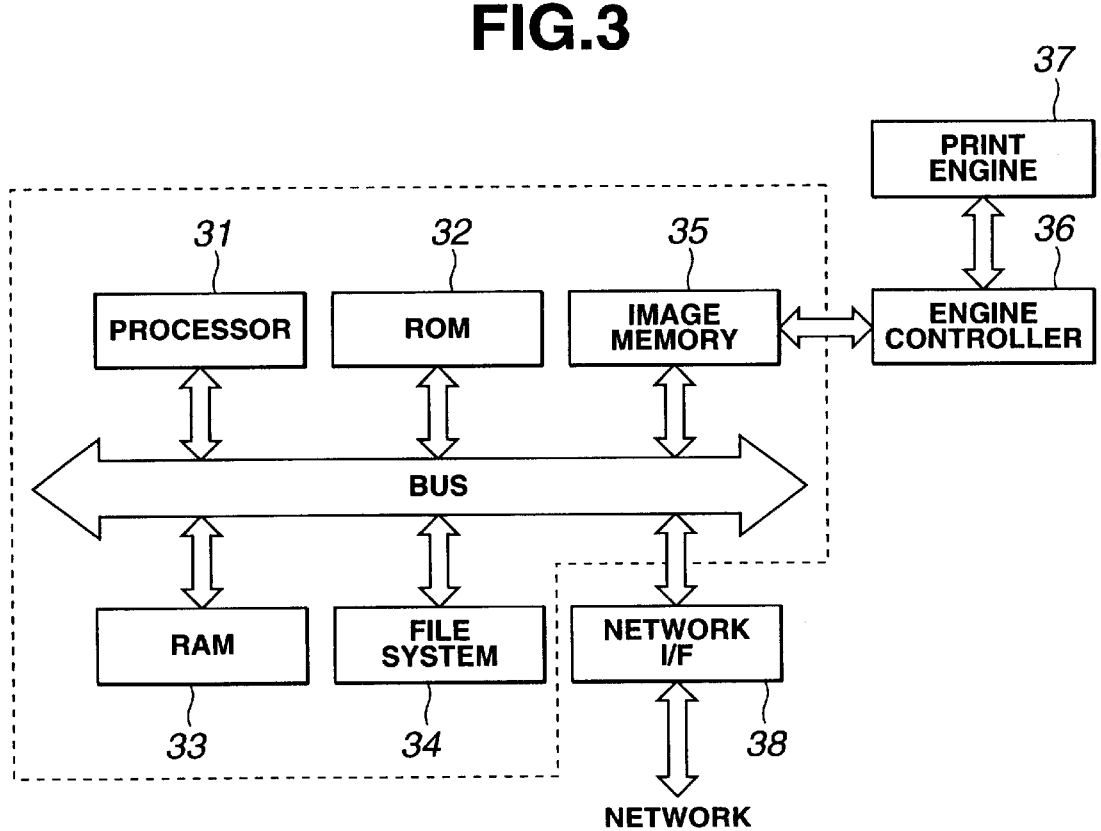
FIG. 3 is a view showing one example of a hardware constitution of a printer of the present invention.

FIG. 3 is a view showing one example of a hardware constitution of the printer according to this embodiment. In the drawing, a processor 31 executes various programs stored in a ROM 32 and a RAM 33. That is, by executing various programs using the processor 31 together with other hardware, it becomes possible to make the printer realize given functions. A file system 34 spools the print job data transmitted from the host apparatus 1 through a network interface 35. An image memory 36 stores the bit map data produced based on the print job data. While controlling the operation of a print engine 38, an engine controller 37 reads out the bit map data developed in the image memory 36 and supplies the bit map data to the print engine 38. The engine controller 37 is started using a print execution command as a trigger which is transmitted from the controller 17 at the point of time that, for example, the bit map data having a given band width is developed in the image memory 36. The print engine 38 is, for example, constituted by a sheet feed mechanism or a print head and executes printing on a print recording medium such as paper. The print engine 38 may be any engine corresponding to the kind of the printer such as a laser printer or a serial printer.

Figure 4:
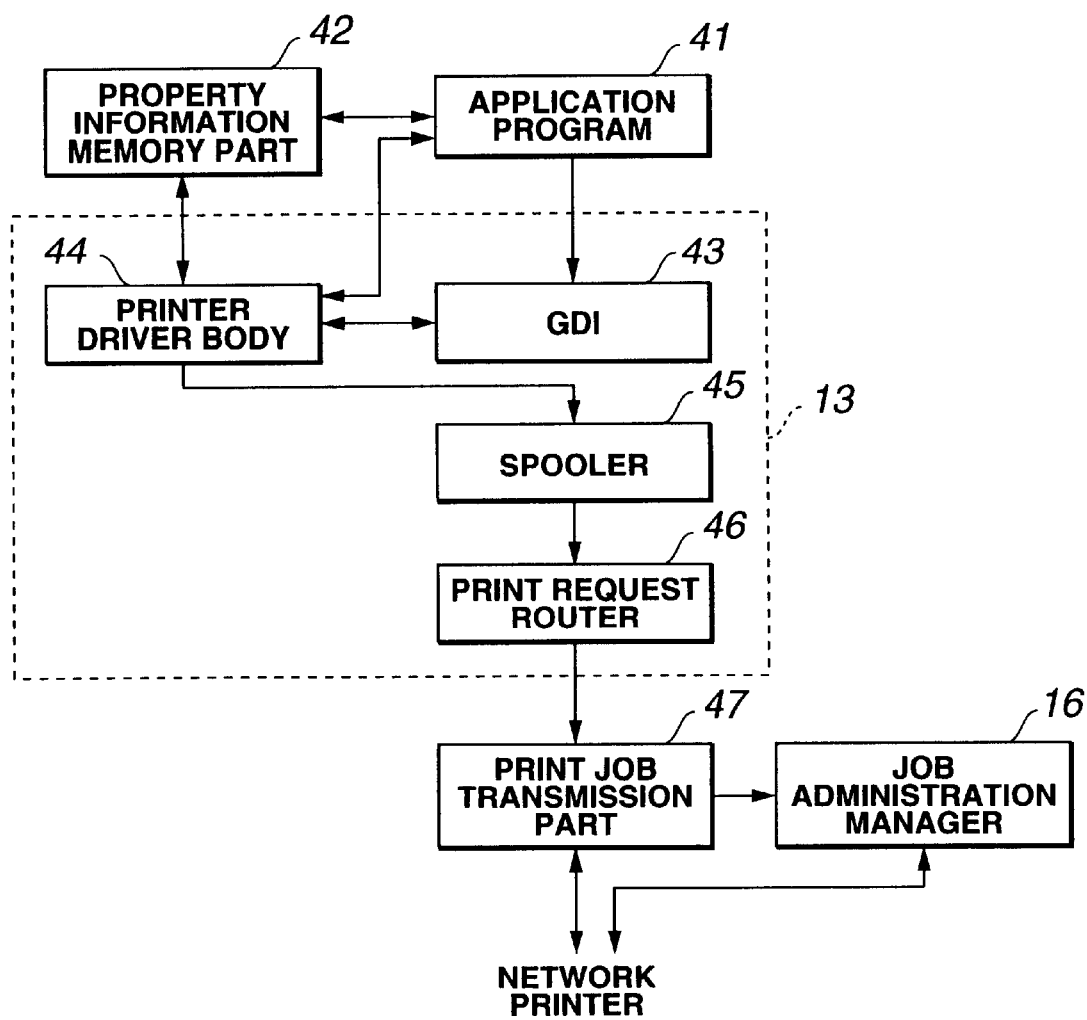
FIG. 4 is a block diagram showing the functional constitution of the host apparatus 1 of the present invention.

FIG. 4 is a block diagram showing the functional constitution of the host apparatus 1 according to this embodiment. This drawing shows the host apparatus 1 shown in FIG. 1 in more detail. An application program 41 (corresponding to the application program 11 shown in FIG. 1), upon receiving a print execution instruction, draws an object in accordance with application data which constitutes a printing object and calls an API (Application Program Interface) of a GDI (Graphics Device Interface) 43. The GDI 43 is a component in the operating system which mounts a graphic function. The GDI 43 calls a printer driver body 44 and prepares a print command concerning the object drawing.

The printer driver body 44 produces the print job data for making the printer 2 execute the printing. That is, based on the call by the GDI 43, the printer driver body 44 suitably obtains setting information of the designated target printer from a property information memory part 42 and outputs such setting information as a print command concerning the print setting and also outputs a print command concerning the object drawing. The setting information of the printer is, for example, information concerning the size and the direction of sheets, the resolution, the area in which printing is possible, or the print job per se.

Further, the printer driver body 44 in this embodiment combines the above-mentioned setting information with information concerning the print job which is inputted by the user through a user interface function (print dialogue box) provided by the printer driver and outputs the combined information as a comment format of the printer command. Here, the information on the print job includes, for example, user names, document names, host names and/or print job names. The user names, the print job names and the like are, typically, inputted by the users through the user interface function provided to the printer driver. Further, the document names and the host names can be obtained due to a function of the application or the operating system. The printer driver body 44 may collect the information on the print job by itself. The information on the print job is not limited to the above-mentioned information and may include any information which are effective for identifying the print job. The comment format of the printer command is a format which is preliminarily decided such that the format is invalidated at the time of interpreting the print command in a print execution part in the inside of the printer controller. The print job data is a set of printer commands necessary for printing documents which the user has made the print request (application data). Here, the print job data are dedicated commands for controlling the printing attributions. The printing attributions include the designation of printing quality, the designation of double-side printing, the designation of number of printing, the designation of a discharge sheet tray, the designation of an input tray and sheet size, the designation of the resolution, the designation of printing language and the like.

The print job data outputted from the print driver body 44 through the GDI 43 is outputted to a spooler 45. The spooler 45 administrates a plurality of print job data and generally transmits these data to the printer in sequence. The spooler 45 utilizes, for example, a given memory area of the file system 25 as a spool area. A print request router 46 controls the destination of its output such that the print job data is routed to the target printer. For example, when the target printer is the network printer, the print request router 46 calls a print job transmission part 47 (corresponding to the print job transmission part 14 in FIG. 1) together with the print job data, while when the target printer is a local printer, the print request router 46 calls a local print provider (not shown in the drawings). The print job transmission part 47 converts the received print job data into the upper layer protocol data of a network hierarchical model. It is preferable that these data format follow the LPD protocol (Line Printer Daemon Protocol as prescribed in RFC1179). The upper layer protocol data outputted by the network print provider 47 is further subjected to the data transformation for the network communication and is transmitted to the printer 1 through the network environment. Here, the network environment means a network environment which is constructed by software and/or hardware which are designated as the lower layer than the network print provider 47.

FIG. 5 is a view for explaining the detailed operation of the printer driver body 44 according to this embodiment. As shown in the drawing, first of all, when a printing command is given from the application program 11, the printer driver body 44 calls a given print dialogue box and receives an input of the attribution information (set items) and various user information (STEP 501). When given information is inputted by a user and an "OK" button mounted on the print dialogue box is selected, the printer driver body 44 obtains the name of application, the name of document, the attribution information and the inputted user information and produces a control command (STEP 502–505). For example, in an EJL type, @EJL JOB INFO letter is prepared. Then, the printer driver body 44 produces print job data (for example, ESC/page command row) based on the application data (STEP 506). FIG. 6 is a view showing one example of the data structure of the print job data according to this embodiment. As shown in the drawing, the print job data includes a control command and a printer command. The control command is comprised of a command which indicates the start of the control command, the job information, the printing attribution information, a transfer command and a command which indicates the completion of the control command. The printer command is provided with an escape command at an end of the printer command to escape from the printer command.

Figure 7:
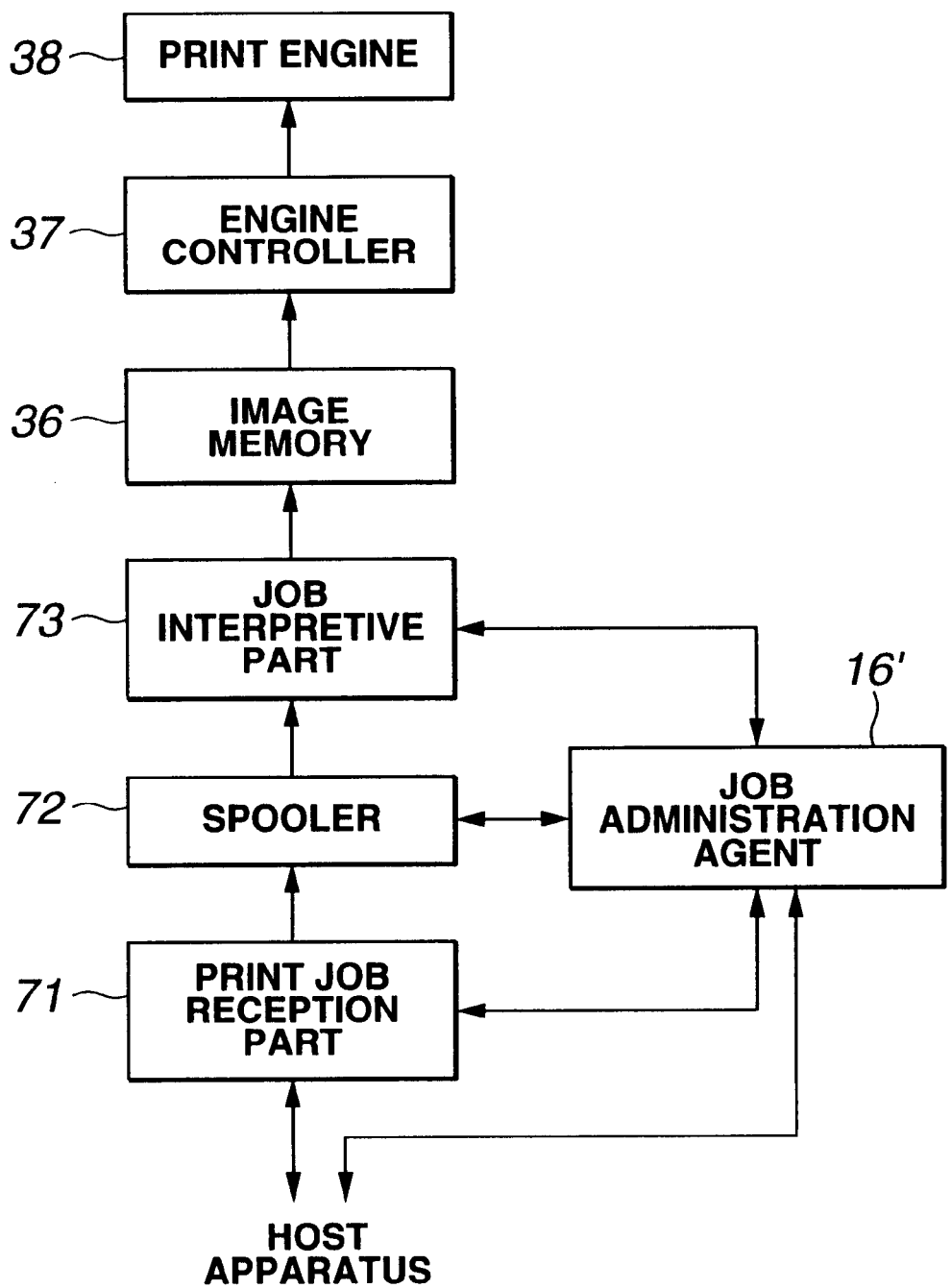
FIG. 7 is a block diagram showing the functional constitution of a printer 2 of the present invention.

FIG. 7 is a block diagram showing the functional constitution of the printer 2 of this embodiment. In the drawing, upon receiving data from the host apparatus 1 through the network environment, a job reception part 71 produces an output to a spooler 72. Upon receiving the data through the network environment, the job reception part 71 extracts network information and outputs this information to the job administration agent 16' as the job administration information. Here, the network information includes, for example, IP addresses, machine names, kinds of protocols and the like. When the protocol program is the LPD, the network information can be obtained by detecting and interpreting the control file. Further, when the print job data is received through a parallel interface, information that the protocol is the parallel interface can be obtained. The job reception part 71 extracts the job administration information included in the control command up to the transfer command in the process to convert the lower layer protocol data to the upper layer protocol data and then outputs the job administration information to the job administration agent 16'. The outputting of the job administration information to the job administration agent 16' by the job reception part 71 may be executed by temporarily storing the job administration information in a buffer not shown in the drawing and then outputting them altogether or by outputting them each time the job administration is extracted.

The spooler 72 administrates a plurality of print job data spooled in the hard disc 18 and transmits these data to a job interpretive part 73 in sequence. The job interpretive part 73 interprets the print job data transmitted from the spooler 72 and produces the bit map data and writes the bit map data in the image memory 36. When the job interpretive part 73 judges that the print job data is of a comment format of the print command, the job interpretive part 73 ignores the line till the end thereof and executes the processing with respect to the next print command. Accordingly, there is no possibility that the information added for administrating the job by the printer driver 13 affects the printing.

The job administration agent 16' receives the job administration information before the job reception part 71 spools the print job data or when the job reception part 71 is in the midst of spooling the print job data. Accordingly, the job administration agent 16' can obtain the reception status of the print job data before the print job data is interpreted by the job interpretive part 73. Here, the reception status means, for example, "in the midst of receiving (in the midst of spooling)", "reception completed (spooling completed)" or the like. When the job administration agent 16' receives an inquiry of the reception status from the job administration manager 16 of the host apparatus 1, the job administration agent 16' replies the reception of the inquiry to the job administration manager 16. In this case, the job administration agent 16' may reply the job administration manager 16 together with the size of reception, the protocol information or the like. Further, the job administration agent 16', upon receiving the job canceling from the job administration manger 16, cancels (deletes) the designated job even when the job administration agent 16' is in the midst of receiving the job.

Figure 8:
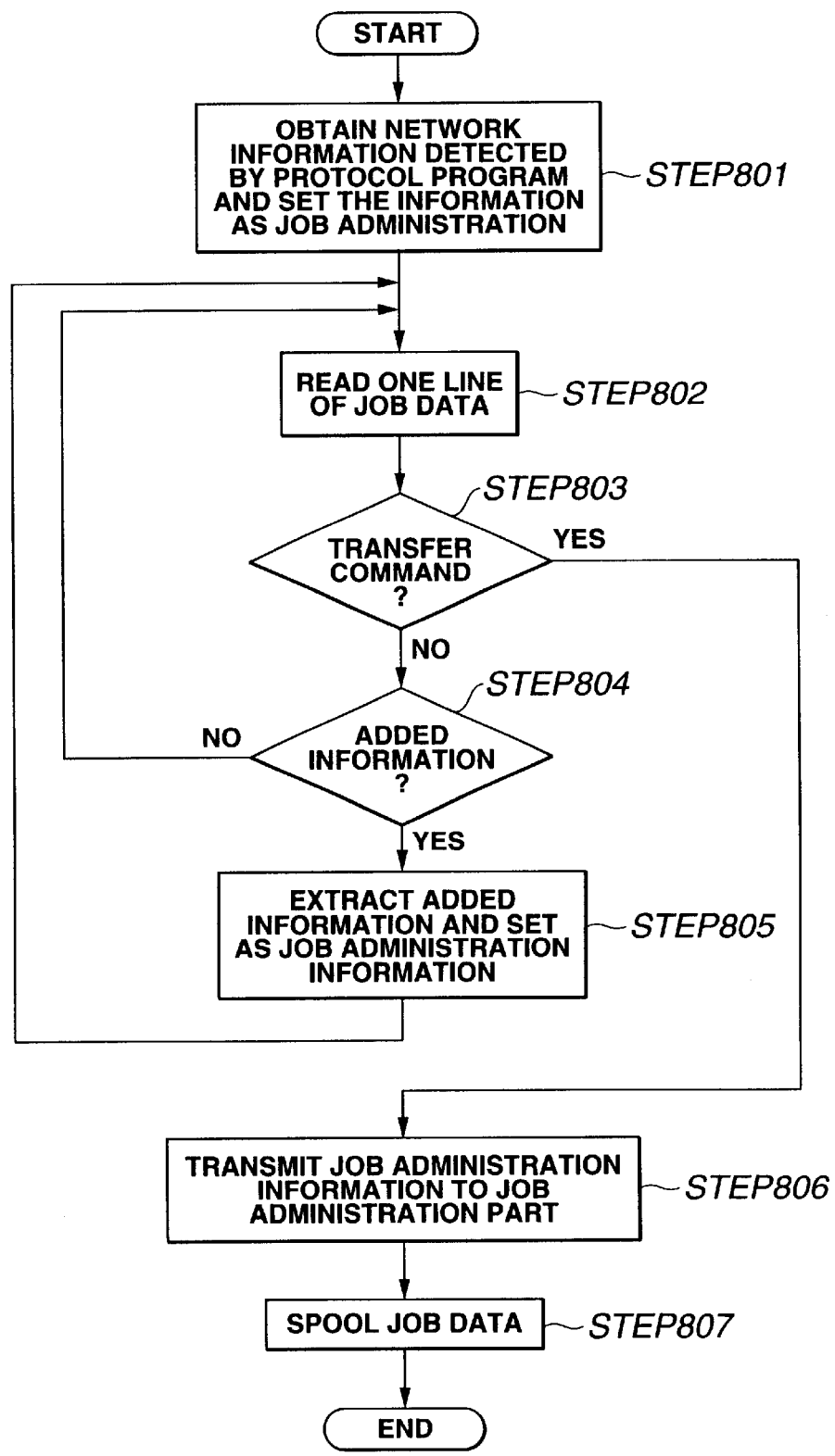
FIG. 8 is a view for explaining a job reception part 71 of the present invention.

FIG. 8 is a view for explaining the operation of the job reception part 71 according to this embodiment. In the drawing, first of all, upon receiving the data, the job reception part 71 obtains the network information thereof and outputs this information to a buffer (STEP 801). Subsequently, the job reception part 71 reads, for example, one line (for example, till "LF") of the print job data for interpreting the head portion of the print job data (STEP 802). The job reception part 71 judges whether the read line is the transfer command or not (STEP 803). If it is judged that the read line is not the transfer command, the job reception part 71 further judges whether the read line is the added information or not (STEP 804). In STEP 804, if it is judged that the read line is the additional information, that is, a comment line which the printer driver 13 has added, this additional information is extracted and is outputted to the buffer (STEP 805). The job reception part 71 repeats the above-mentioned processing until the transfer command is detected. When the transfer command is detected in STEP 803, the content outputted to the buffer is outputted to the job administration agent 16' as the job administration information (STEP 806). Then, the job reception part 71 outputs the print job data to the hard disc 18 (STEP 807).

Upon receiving the job inquiry request including the job administration information from the network interface, the job administration agent 16' shown in FIG. 7 collects the status of the job and transmits the status to the host apparatus 1. Accordingly, the job administration manager 16 of the host apparatus 1 can administrate the print job data indicated by the job administration information through the job administration agent 16'. Particularly, in this embodiment, the job administration information can be obtained in the process that the job reception part 71 converts the lower layer protocol data to the upper layer protocol data. Accordingly, even before the print job data is interpreted by the job interpretive part 73, the print job data can be specified in accordance with the job administration information and the job administration for this print job data can be executed. For example, a plurality of print job data can be spooled by the spooler 72 and the processing can be executed with respect to specific print job data waiting for the interpretation. Further, even when the protocol program 81 is in the midst of spooling by the spooler 72, the job administration with respect to the print job data can be executed.

The above-mentioned embodiments are exemplary illustrations for explaining the present invention and are not intended to restrict the present invention to these embodiments. The present invention can be exercised in various forms without departing from the gist of the present invention. For example, although the operations for realizing the above-mentioned functions are explained in sequence, the present invention is not limited to such manner of operations. Accordingly, unless the manner of operations becomes contradictory, the invention may be constituted such that the sequence of processing is exchanged or the operations are executed in parallel.

I claim:

1. A printer comprising;
   first reception means which receives print job data including job administration information transmitted from a host apparatus,
   extracting means which extracts the job administration data from the print job data received by the first reception means,
   memory means which stores the print job data received by the first reception means,
   interpretive means which produces bit map data based on the print job data read out from the memory means,
   printing executing means which executes printing based on the bit map data produced by the interpretive means, and
   job administration means which administrates the print job data stored in the memory means based on the job administration information extracted by the extracting means.

2. A printer according to claim 1, wherein the printer further includes second reception means which receives a job administration request transmitted from the host apparatus and the job administration means transmits a response to the job administration request to the host apparatus based on the job administration information.

3. A printer according to claim 2, wherein the job administration request is an inquiry of the status of the job concerning the print job data and the job administration means transmits a state in which the print job data is being outputted to the memory means after being received by the first reception means, a state in which the print job data is stored by the memory means, a state in which the print job data is read out from the memory means or the like to the host apparatus as the state of the job.

4. A method for controlling a printer comprising;
   a receiving step for receiving print job data which is transmitted from a host apparatus and includes job administration information,
   an extracting step for extracting the job administration information from the print job data received by the receiving step,
   a storing step for outputting the print job data received by the receiving step into given memory means,
   an interpreting step for producing bit map data based on the print job data read out from the memory means,
   a printing step for executing printing based on the bit map data produced by the interpreting step, and
   an administrating step in which before the print job data is read out from the memory means in the interpreting step, the print job data is administrated based on the job administration information extracted by executing the extracting step.

5. A method for controlling a printer according to claim 4, wherein said administrating step includes a step for receiving a job administration request transmitted from the host apparatus and a step for transmitting a response to the job administration request to the host apparatus based on the job administration information.

6. A method for controlling a printer according to claim 5, wherein the job administrating step transmits a state in which the print job data is being outputted to the memory means after being received by the reception means, a state in which the print job data is stored by the memory means, a state in which the print job data is read out from the memory means to the host apparatus or the like as the state of the job.

7. A recording medium storing a program for making a printer realize given functions, said program comprising;
   a function of receiving print job data including job administration information which is transmitted from a host apparatus,
   a function of extracting the job administration information from the received print job data,
   a function of storing the received print job data,
   a function of producing bit map data based on the print job data read out from the memory means,
   a function of controlling printing executing means which executes printing to a printing recording medium based on the produced bit map data, and
   a function of administrating print job data stored in the memory means based on the extracted job administration information.

8. The program of claim 7, wherein the program further includes a function of receiving a job administration request transmitted from the host apparatus and the function of administrating print job data transmits a response to the job administration request to the host apparatus based on the job administration information.

9. The program of claim 8, wherein the job administration request is an inquiry of the status of the job concerning the print job data and the function of administrating print job data transmits a state in which the print job data is being outputted to the memory means after being received by the function of receiving print job data, a state in which the print job data is stored by the memory means, a state in which the print job data is read out from the memory means or the like to the host apparatus as the state of the job.

10. A print system including a host apparatus and a printer, wherein the host apparatus comprises;
    user interface means which displays a given input request screen and receives given job administration information from a user,
    producing means which produces print job data based on the received job administration information and application data which constitutes a printing object,
    first transmitting means which transmits the produced print job data to the printer,
    and second transmitting means which transmits the job administration information to the printer, and
    the printer comprises;
    first receiving means which receives the print job data transmitted from the host apparatus,
    extracting means which extracts the job administration information from the received print job data,
    memory means for storing the received print job data,
    interpretive means which produces bit map data based on the print job data read out from the memory means,
    printing executing means which executes printing based on the bit map data produced by the interpretive means, and
    job administration means which administrates the print job data stored in the memory means based on the job administration means, wherein job administration means receives a job administration request transmitted from the host apparatus and transmits a response to the job administration request to the host apparatus.

11. The print system of claim 10, wherein the system further includes a second receiving means which receives a job administration request transmitted from the host apparatus and the job administration means transmits a response to the job administration request to the host apparatus based on the job administration information.

12. The print system of claim 11, wherein the job administration request is an inquiry of the status of the job concerning the print job data and the job administration means transmits a state in which the print job data is being outputted to the memory means after being received by the first reception means, a state in which the print job data is stored by the memory means, a state in which the print job data is read out from the memory means or the like to the host apparatus as the state of the job.

13. A printer comprising;

first reception means which receives print job data including job administration information transmitted from a host apparatus, first interpretive means which extracts and interprets the job administration information from the print job data received by the first reception means, memory means which stores the print job data received by the first reception means, second interpretive means which interprets the print job data read out from the memory means and produces bit map data, printing executing means which executes printing based on the bit map data produced by the interpretive means, and job administration means which administrates the print job data stored in the memory means based on the job administration information interpreted by the first interpretive means.

14. The printer of claim 13, wherein the printer further includes a second reception means which receives a job administration request transmitted from the host apparatus and the job administration means transmits a response to the job administration request to the host apparatus based on the job administration information.

15. The printer of claim 14, where the job administration request is an inquiry of the status of the job concerning the print job data and the job administration means transmits a state in which the print job data is being outputted to the memory means after being received by the first reception means, a state in which the print job data is stored by the memory means, a state in which the print job data is read out from the memory means or the like to the host apparatus as the state of the job.

* * * * *